United States Patent [19]
Curhan

[11] Patent Number: 5,134,986
[45] Date of Patent: * Aug. 4, 1992

[54] INTERNAL COMBUSTION ENGINE WITH FUEL HEATER

[75] Inventor: Jeffrey A. Curhan, Medway, Mass.

[73] Assignee: Texas Instruments Incorporated, Dallas, Tex.

[*] Notice: The portion of the term of this patent subsequent to Feb. 11, 2009 has been disclaimed.

[21] Appl. No.: 757,102

[22] Filed: Sep. 10, 1991

Related U.S. Application Data

[62] Division of Ser. No. 571,384, Aug. 22, 1990, Pat. No. 5,086,747.

[51] Int. Cl.⁵ .................................... F02M 31/00
[52] U.S. Cl. ...................... 123/549; 123/545; 123/547
[58] Field of Search ............ 123/549, 557, 545, 547, 123/552

[56] References Cited

U.S. PATENT DOCUMENTS

| | | | |
|---|---|---|---|
| 3,760,780 | 9/1973 | Jordan | 123/179 H |
| 4,141,327 | 2/1979 | Marcoux et al. | 123/549 |
| 4,356,804 | 11/1982 | Igashira et al. | 123/549 |
| 4,366,798 | 1/1983 | Goto et al. | 123/549 |
| 4,384,563 | 5/1983 | Siefer et al. | 123/549 |
| 4,387,291 | 6/1983 | Keppel | 219/206 |
| 4,387,690 | 6/1983 | Chiavaroli | 123/549 |
| 4,756,294 | 6/1988 | Nakayama et al. | 123/549 |
| 4,834,053 | 5/1989 | Van Der Ploeg et al. | 123/549 |
| 4,919,105 | 4/1990 | Duelli | 123/590 |
| 4,967,706 | 11/1990 | Van Wechem et al. | 123/549 |
| 5,007,402 | 4/1991 | Scherenberg | 123/549 |
| 5,056,495 | 10/1991 | Yamashita et al. | 123/549 |

FOREIGN PATENT DOCUMENTS

| | | |
|---|---|---|
| 0234052 | 9/1987 | European Pat. Off. . |
| 0343652 | 11/1989 | European Pat. Off. . |
| 0456535 | 11/1991 | European Pat. Off. . |
| 3149564 | 6/1983 | Fed. Rep. of Germany . |
| 3247978 | 6/1984 | Fed. Rep. of Germany . |
| 3426469 | 1/1986 | Fed. Rep. of Germany . |
| 3921739 | 8/1990 | Fed. Rep. of Germany . |
| 2393146 | 12/1978 | France . |

*Primary Examiner*—E. Rollins Cross
*Assistant Examiner*—M. Macy
*Attorney, Agent, or Firm*—Russell E. Baumann; Rene' E. Grossman; Richard L. Donaldson

[57] ABSTRACT

An internal combustion engine has a channel member such as a plenum chamber or cylinder head or the like with an inlet receiving air and fuel to form an air-fuel mixture and with a pair of outlets furnishing the air-fuel mixture to respective cylinders or groups of cylinders or to respective cylinder intake valve openings of two-intake engine cylinders or the like. A heating device mounted on the channel member has a heat-exchange surface which intercepts the air and fuel from the inlet to heat and fully vaporize the fuel to form the air-fuel mixture and also to divide the fuel mixture between the two outlets for furnishing the fuel mixture to the individual cylinders, groups of cylinders or intake valve openings.

2 Claims, 5 Drawing Sheets

INTERNAL COMBUSTION ENGINE WITH FUEL HEATER

This application is a division of application Ser. No. 07/571,384, filed Aug. 22, 1990, now U.S. Pat. No. 5,086,747, issued Jun. 27, 1991.

BACKGROUND OF THE INVENTION

The field of the invention is that of internal combustion engines and the invention relates more particularly to internal combustion engines having a fuel heater for enhancing fuel vaporization before the fuel is furnished to engine cylinders.

Conventional internal combustion engines combine air and fuel in selected ratios for furnishing to engine cylinders and typically arrange electrical resistance heater elements to heat the fuel to enhance fuel vaporization to assure or maintain a desired air-fuel ratio, particularly during engine warm-up on a cold day. In one widely used engine system for example, a self-regulating multi-passaged electrical resistance heater element of positive temperature coefficient of resistivity (PTC) is disposed between a carburetor and an intake manifold so that an air-fuel mixture substantially formed in the carburetor is passed through the heater element to be fully vaporized to complete formation of the air-fuel mixture before it is advanced to the engine cylinders. In another widely used engine system a heater plate is mounted in an opening in the bottom of an intake manifold beneath a carburetor for intercepting and heating air and fuel directed into the intake manifold before the manifold distributes the air-fuel mixture to individual engine cylinders. In other more recently proposed engine systems of the fuel injector type, fuel injectors are arranged to direct fuel into inlet channels in a cylinder head to provide precisely regulated air-fuel ratios to individual engine cylinders and electrical resistance heater elements are disposed in the respective cylinder head channels to intercept and heat fuel sprayed from the individual injectors to achieve the desired air-fuel ratio even during engine start-up on a cold day. However, it would be desirable in some of those engine systems such as those for four cylinder engines if fewer heater elements could be used in providing adequate fuel heating, if such fuel heating could be achieved with less interference with the flow of an air-fuel mixture to the engine cylinders or with less interference with distribution of the air-fuel mixture to the different cylinders, if such heater elements could be accommodated in otherwise conventional engines with less interference with coolant fluid passages and the like, and if heating of the fuel could be achieved closer to furnishing of the air-fuel mixture to the cylinders particularly in the case of engine systems having two intake valves for each cylinder.

BRIEF SUMMARY OF THE INVENTION

It is an object of the invention to provide a novel and improved internal combustion engine; to provide such an engine having improved means for enhancing fuel vaporization in forming an air-fuel mixture to be furnished to engine cylinders; to provide such an engine in which the fuel is heated close to furnishing of the air-fuel mixture into the cylinders; to provide such an engine in which fuel heating is accomplished with minimal interference with the flow of air-fuel mixture to the engine cylinders or with distribution of the air-fuel mixture to the different cylinders or to different intake valves in a cylinder; to provide such an engine which easily accommodates improved fuel heating means with otherwise conventional engine components; and to provide novel and improved fuel heating devices for use in such engines.

Briefly described, the novel and improved internal combustion engine of the invention comprises a channel member such as the plenum chamber of an engine having a throttle body type of fuel supply system or the like or the cylinder head of an engine of the fuel injector type having two-intake engine cylinders. The member channel has an inlet for receiving air and fuel within the channel to form an air-fuel mixture and has a pair of outlets from the channel for furnishing the air-fuel mixture to two cylinders or groups of cylinders or to two intake valve openings in one cylinder. A heating device is arranged to intercept the air and fuel directed into the channel inlet for heating the fuel to substantially fully vaporize the fuel and fully form the air-fuel mixture with the desired air-fuel ratio and also serves to smoothly divide the air-fuel mixture properly between the two outlets for furnishing to respective engine cylinder means. Preferably the heating device has a V-shaped heat-exchange surface on a metal component or the like and has a pair of heat-exchange surface sections disposed on one side of the component to extend at selected angles from a common edge between the surface sections. A pair of self-regulating electrical resistance heater elements of positive temperature coefficient of resistivity are disposed in thermally and electrically conductive engagement with an opposite side of the metal component to be electrically energized to transfer heat to the respective heat-exchange surface sections. Terminal means are arranged for energizing the heater elements. Preferably a metal particulate or the like is sintered to the heat-exchange surface sections of the V-shaped surface to enhance vaporization of fuel intercepted by the surface sections. In one preferred embodiment, the metal component has an integral mounting flange portion at one end of the V-shaped surface and is inserted into an aperture in a side wall of a plenum chamber close to the bottom of the plenum channel so that the flange is mounted against the side wall around the aperture and so that both of the heat-exchange surface sections of the V-shaped surface are disposed in facing relation to an inlet to the plenum chamber. In that way, the heating device is arranged for intercepting and heating air and fuel directed into the chamber channel to form an air-fuel mixture and smoothly divides the air-fuel mixture to be furnished to cylinders or groups of cylinders at respective opposite ends of the plenum chamber channel. The heating device is easily accommodated in the conventional plenum chamber component without interference with coolant fluid flow passages and the like and is located relatively closer to the engine cylinders than many known engine systems having plenum chamber fuel supply systems.

In another preferred embodiment of the invention, a gasket support or the like is secured between a cylinder head and an inlet tube in an internal combustion engine of the injector type, the cylinder head having a plurality of channels leading to respective engine cylinders, each of the channels having an inlet for receiving air and fuel into the channel from respective fuel injectors and inlet tube passages for example for forming air-fuel mixtures in the respective channels, and each having two outlet for furnishing each air-fuel mixture to respective cylinder intake valve openings of a two-intake valve engine cylinder at the outlet end of each channel. Preferably metal components with a V-shaped heat-exchange surface having self-regulating heater elements arranged to transfer heat to each of two sections of the heat-exchange surface are mounted between the distal ends of respective pairs of beams which extend from a gasket support into the respective cylinder head channels. The V-shaped surfaces are disposed with two heat-exchange surface sections of each component in facing relation to the inlet to the channel. In that arrangement, the V-shaped heat-exchange surfaces intercept air and fuel directed into the respective cylinder head channels for vaporizing the fuel to form air-fuel mixtures of desired air-fuel ratios in the individual channels and divide the air-fuel mixture for furnishing via two channel outlets to the respective cylinder intake valve openings of each of the two-intake-valve engine cylinders.

DESCRIPTION OF THE DRAWINGS

Other objects, advantages and details of the novel and improved internal combustion engine of the invention appear in the following detailed description of preferred embodiments of the invention, the detailed description referring to the drawings in which.

DESCRIPTION OF THE PREFERRED EMBODIMENTS

Figure 1:
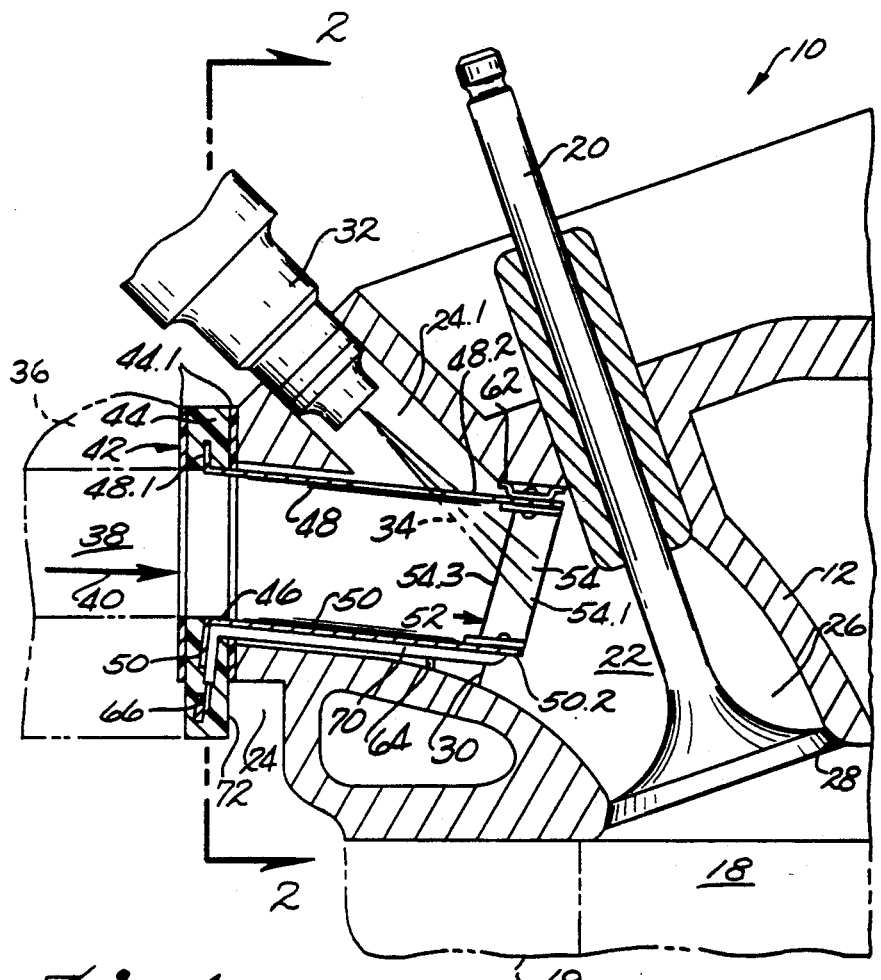
FIG. 1 is a partial section view along a longitudinal axis of a cylinder in an internal combustion engine provided by the invention.
Figure 2:
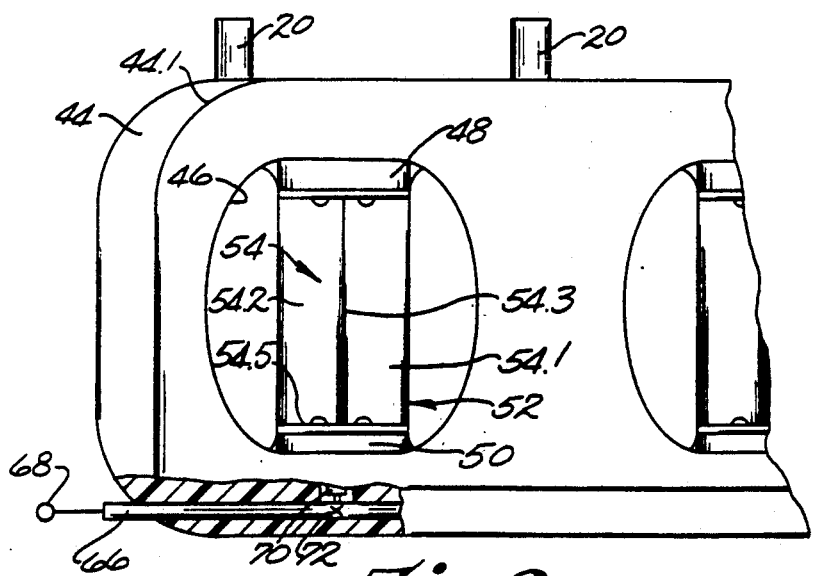
FIG. 2 is a partial section view along line 2—2 of FIG. 1.

Referring to the drawings, 10 in FIGS. 1–2 indicates a preferred embodiment of the novel and improved internal combustion engine of the invention which is shown to include a channel member 12 such as a cylinder head means for an engine of a fuel injector type having a plurality of engine cylinders 18 (only one being shown in FIG. 1) in the engine block indicated at 19, each cylinder being of the type having two intake valves 20 (only one being shown in FIG. 1). The cylinder head means has a channel 22 provided in the head for each of the engine cylinders, each channel having an inlet 24 and having a pair of channel outlets 26 (only one being shown in FIG. 1) leading to respective ones of two cylinder intake valve openings 28 (only one being shown) entering each cylinder 18. That is, the cylinder head channel 22 divides at a cylinder wall edge 30 to provide an additional channel outlet 26 (lying behind the outlet 26 as viewed in FIG. 1) to furnish air-fuel mixture to a second intake valve to cylinder 18. See FIG. 1. A fuel injector 32 of any conventional type is mounted on the cylinder head for example for each engine cylinder to direct periodic sprays or streams of fuel into the channel 22 as indicated at 34 in FIG. 1. An inlet tube means 36 is secured to the cylinder head for directing air from inlet tube passages 38 into respective cylinder channels 22 as indicated by the arrows 40. In that way the air and fuel directed into the channels 22 are adapted to form an air-fuel mixture of selected air-fuel ratio in each channel and to furnish that mixture to the respective intake valve openings 28 for the cylinder 18. Although the fuel injector is shown mounted on the cylinder head to direct fuel into the channel 22 through a separate portion 24.1 of the channel inlet, the fuel injectors can also be mounted on the inlet tube means or the like to direct fuel into the channel through the same inlet portion as the air 40 within the scope of this invention.

In accordance with the invention, a heating device 42 is mounted on the engine to dispose a heat-exchange surface within each cylinder head channel to intercept air and fuel directed into the channel for heating the fuel to fully vaporize the fuel and complete forming of the desired air-fuel mixture just prior to the air-fuel mixture being furnished to the engine cylinder 18. The heat-exchange surface also serves to divide the air-fuel mixture for furnishing the mixture to each of the cylinder intake valve openings through the respective channel outlets 26.

Figure 3:
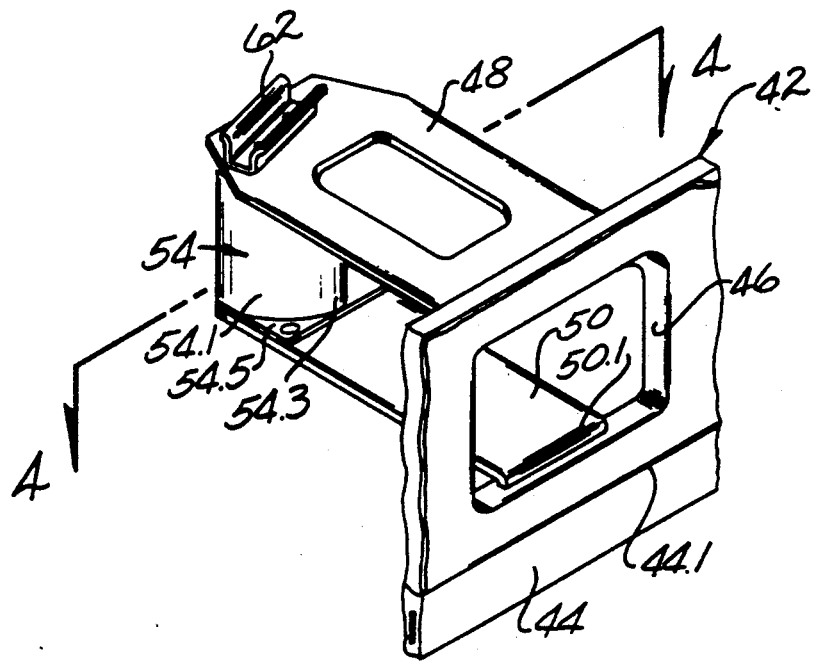
FIG. 3 is a partial perspective view of a heating device used in the internal combustion engine of FIG. 1.
Figure 4:
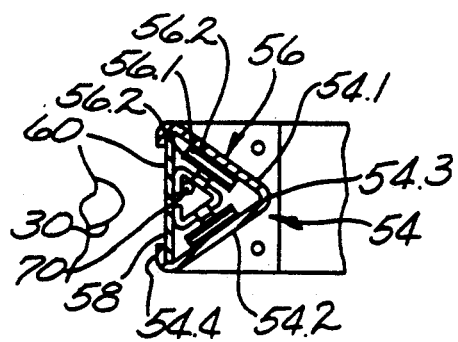
FIG. 4 is a section view along line 4—4 of FIG. 3.

In a preferred embodiment of the invention, a support 44 preferably of an electrical and thermal insulating material such as a phenolic or composite material or the like has openings 46 in the support leading into each of the cylinder head channels 22 and preferably has compressible gasket skin layers 44.1 secured on portions of opposite support sides around the support openings with adhesive or the like. The support is secured between the cylinder head 12 and inlet tube member 36 in the manner conventional with head gaskets for sealing the inlet tube passages to the respective channels 22. A pair of beams 48, 50 have ends 48.1, 50.1 embedded in the support within each support opening 46 and extend in cantilever relation into the channel 22 along respective opposite sides (the top side and bottom side as shown in FIG. 1) of the channel. If desired, the beams can be accommodated in recesses in the walls of the channels 22 to be flush with those walls. In a preferred embodiment, the beams are formed of steel or the like but the beams are also formed of aluminum, phenolic or composite material or the like within the scope of the invention. A metal component 52 having a V-shaped heat-exchange surface 54 is mounted between the distal ends 48.2, 50.2 of the beams so that the two heat-exchange surface sections 54.1, 54.2 which extend back from a common edge 54.3 between the surface sections on one side of the component are both disposed in facing relation to the channel inlet 24 to intercept the air 40 and fuel 34 directed into the channel. As is best shown in FIGS. 3 and 4, a pair of self-regulating electrical resistance heater elements 56, each having a body 56.1 of a ceramic material such as lanthanum-doped barium titanate or the like and having metal contacts 56.2 on opposite sides thereof, are disposed with one metal contact in thermally and electrically conductive engagement with an opposite side of the metal component to be electrically energized for transferring heat to respective heat-exchange surface sections 54.1, 54.2. Preferably a resilient spring terminal means 58 is arranged in electrically conductive engagement with the other metal contacts on the heater elements and a body 60 is secured to the metal component, by folded-in edges of the component as indicated at 54.4 for example, for retaining the spring means in electrical contact with the heater elements. The body 60 as shown is formed of an electrically insulating material but can also be formed to a thermally conducting metal insulated from the spring means 58 by an insulating strip material or the like within the scope of the invention. Where formed of metal the body 60 can also be welded to the metal component 52. If desired, the metal component 54 has flange portions 54.5 at ends of the V-shaped heat-exchange surface which are riveted to the respective beam ends 48.2, 50.2 as shown. Alternately the beams are adapted to be made integral with the metal component and in a preferred embodiment at least one of the beams is electrically conductive. Preferably a spring means 62 is secured to the heating device to be in electrically conductive engagement with the metal component 54 and resiliently engages the cylinder head in each channel 22 to electrically ground the metal component to the head and to cooperate with a foot 64 bent out of the other beam for example in precisely positioning the heating device in the channel 22. The resilient terminal means 58 is arranged to be electrically connected to a vehicle power supply. Preferably for example, a buss bar 66 is embedded in the electrically insulating support to be connected to the power supply as indicated at 68 in FIG. 2 and the leads 70 electrically connect the respective spring terminals 58 to the buss bar by welds or the like as indicated at 72 at FIG. 1.

In that arrangement, the heating device 42 is easily and compactly accommodated in an otherwise conventional cylinder head in an otherwise conventional engine system to intercept air and fuel directed into each channel 22 very close to the cylinders 18, to heat the fuel and substantially fully vaporize it to form the air-fuel mixture having the desired air-fuel ratio, and to smoothly and properly divide the air-fuel mixture to deliver it to the respective intake valve openings through respective ones of a pair of outlets 26 from the channel. This heating device is particularly advantageous used in an engine having intake manifold and cylinder head means formed of low thermal conductivity materials such as plastics or ceramics.

Figure 5:
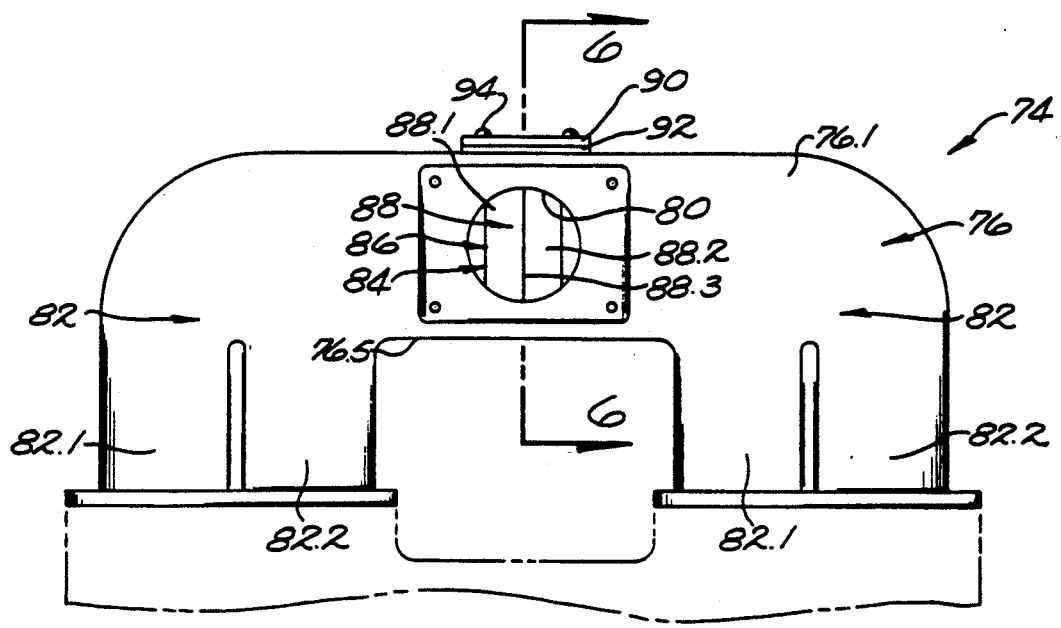
FIG. 5 is a partial plan view of another preferred embodiment of an internal combustion engine of the invention.
Figure 6:
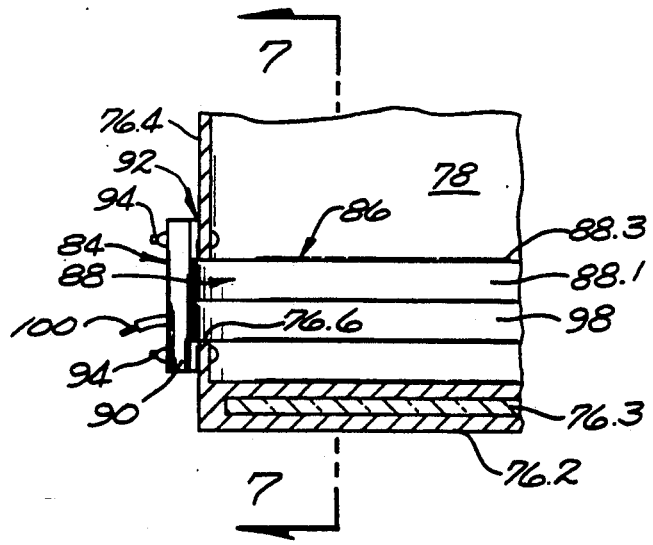
FIG. 6 is a partial section view along line 6—6 of FIG. 5.
Figure 7:
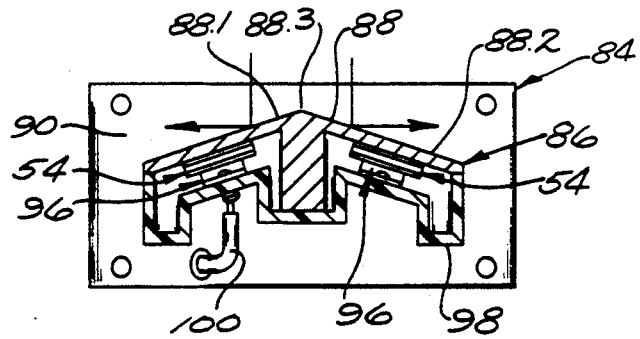
FIG. 7 is a section view along line 7—7 of FIG. 6.

In another preferred embodiment of the invention as indicated at 74 in FIGS. 5-6, the channel member comprises a plenum chamber 76 or the like such as is conventionally used in four or six-cylinder internal combustion engines or the like having carburetor or throttle bottle body fuel supply systems or the like. As shown, the plenum chamber has a top 76.1, a bottom 76.2 which typically has a coolant fluid passage 76.3 formed therein, and a pair of side walls 76.4, 76.5 defining a channel 78 within the plenum chamber. The chamber has an inlet 80 provided in the top wall of the chamber to receive a carburetor or throttle body flange or the like and has a pair of outlets 82 at respective opposite ends of the channel. If desired the channel ends are further divided into two sections as indicated at 82.1, 82.2 for providing an air-fuel mixture to one engine cylinder through each outlet section as will be understood.

In accordance with this invention, a heating device 84 has a metal component 86 having a V-shaped heat-exchange surface 88 which is mounted on the plenum chamber so that two heat-exchange surface sections 88.1, 88.2 which extend away from a common edge 88.3 between the surface sections are both disposed in facing relation to the channel inlet 80. In that arrangement, the heat-exchange sections of the heating device intercept air and fuel or air-fuel mixtures or the like directed into the plenum chamber channels to fully vaporize the fuel to complete formation of the desired air-fuel mixture so that it has the desired air-fuel ratio. The device also serves to smoothly divide the air-fuel mixture for delivery to individual engine cylinders or groups of cylinders at respective outlets from the chamber channel 78. Preferably the metal component 86 forming the V-shaped surface has an integral mounting flange portion 90 at one end of the V-shaped surface and the plenum chamber side wall 76.4, has an opening 76.6 close to the chamber bottom for receiving the heating device and permitting the mounting flange to abut the side wall, the gasket 92 being disposed between the flange and wall to seal the chamber and thermally isolate the heating device from the chamber except where secured by bolts 94. In that way, the heater device is conveniently mounted on the plenum chamber close to the chamber bottom to intercept air and fuel entering at the inlet 80 and to smoothly divide the air-fuel mixture for directing it throughout the full cross-section of the channel 78 without interfering with the coolant fluid passage 76.3 e.g. Preferably a pair of self-regulating electrical resistance heater elements as described above are disposed with one metal contact of each element in electrically and thermally conductive engagement with a side of the metal component opposite from the heat-exchange surface sections 88.1, 88.2 to be electrically energized for transferring heat to the respective heat-exchange surface sections. A resilient spring terminal means 96 is arranged in electrically conductive engagement with the other metal contacts of the heater elements as will be understood and an electrically insulating body 98 is secured to the metal component or the like for retaining resilient spring terminals in electrically conductive engagement with the heater elements. Preferably a lead 100 is electrically connected to the spring terminal and extends in pressure sealed relation through the mounting flange for connecting the heater elements to a vehicle power supply. In that arrangement, the internal combustion engine 74 is conveniently adapted to provide early fuel evaporation heating for the four or six engine cylinder engines using a single heating device easily mounted on a conventional engine component while also providing heating relatively closer to the engine cylinders than would be the case with known fuel heating systems of comparable type.

Figures 8A, 8B:
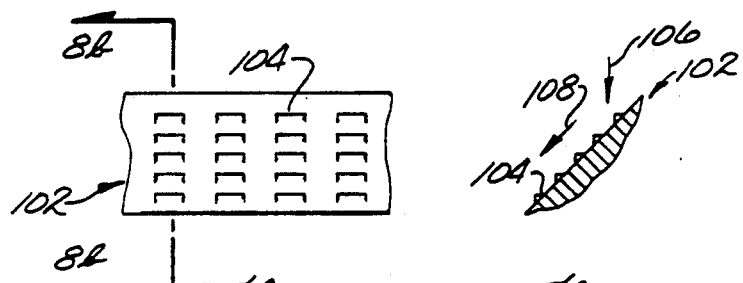
FIGS. 8A–8B, 9A–9B, 10A–10B, 11A–11B, and 12A–12B are partial plan view and partial section views respectively of surfaces of a component used in other preferred embodiments of heating devices used in the engine of the invention.
Figures 9A, 9B:
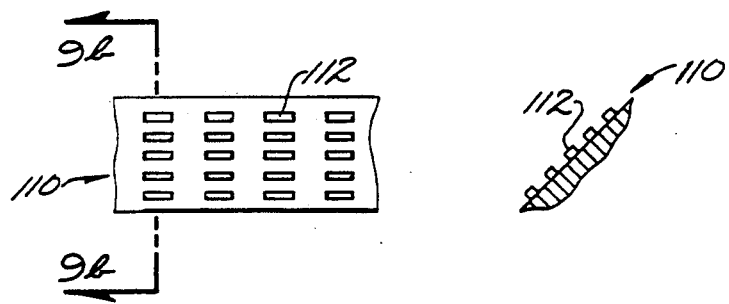
Figures 10A, 10B:
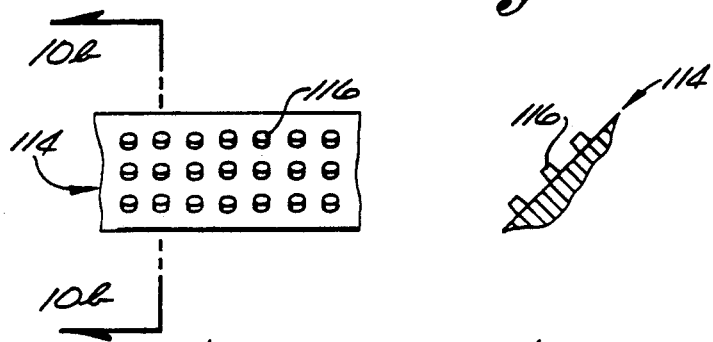
Figures 11A, 11B:
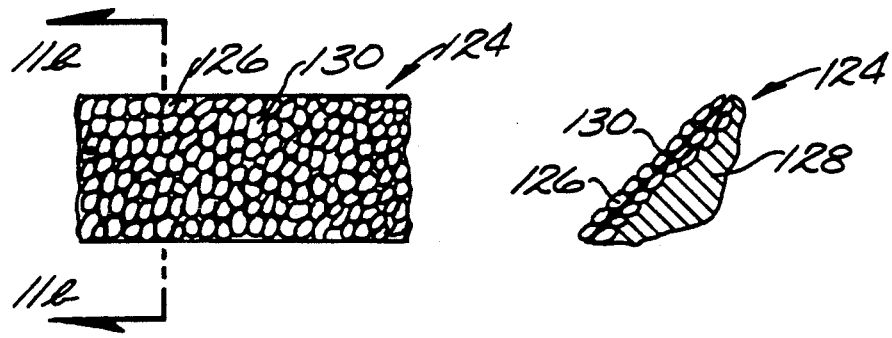
Figures 12A, 12B:
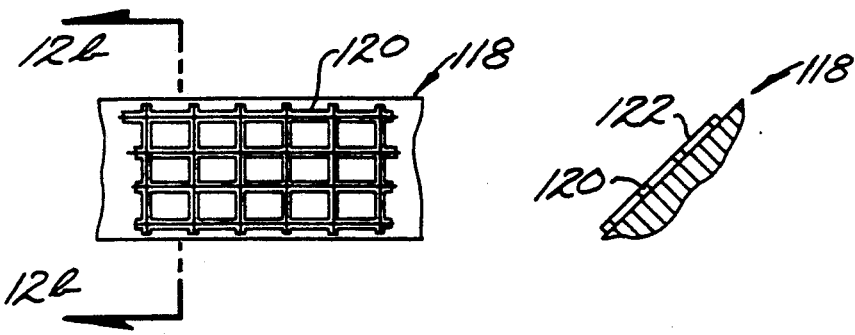

In another preferred embodiment of the invention as indicated at 102 in FIG. 8A, the engine incorporates a heating device such as that shown in FIGS. 1-4 or 5-7 wherein the heat-exchange surface sections of the heating device (only one being shown in FIG. 8A) is coined or otherwise formed with sloped projections 104 to be upstanding from the surface section so that any liquid fuel droplets or the like which might impinge on the surface section as indicated by the arrow 106 in FIG. 8B and which would tend to run down the surface section as indicated by the arrow 108 would be slowed in its flow and would encounter increased surface area of the surface section resulting from the projections for enhancing heat transfer to the fuel, enhancing vaporization at the surface section. Other comparable arrangements are shown in FIGS. 9A-9B, 10A-10B and 12A-12B. Thus the engine system embodiment shown at 110 in FIGS. 9A-9B has vertical barrier projections 112 to more fully retard fuel flow on the surface section; the system shown at 114 in FIGS. 10A-10B has tapered projections 116 tending to deflect the fuel to flow in various directions over the surface section; and the system 118 shown in FIGS. 12A-12B having a screen member 120 sintered or brazed or the like to the surface section or cast into the surface section to form wells 122 which tend to retain liquid fuel until vaporized. In all of these embodiments, the projections increase the effective heat-transfer area of the heat-exchange surface sections and retard fuel flow over the surfaces. In one preferred embodiment as shown at 124 in FIGS. 11A-11B, a multiplicity of metal particles 126 of brass or copper or the like of high thermal conductivity are sintered to each other and to the surface section 128 itself to provide a multiplicity of pores or interstices 130 between the particles which serve to greatly increase the effective heat-transferring section surface and tend to hold any liquid fuel in the pores until it is vaporized.

It should be understood that although particular embodiments of the invention have been described by way of illustrating the invention, the invention includes all modifications and equivalents of the disclosed embodiments falling within the scope of the appended claims.

I claim:

1. An internal combustion engine comprising engine cylinder means, fuel injector means furnishing fuel for the cylinder means, channel means receiving fuel from the fuel injector means and furnishing a flow of air and fuel to the cylinder means, the channel means including means dividing the flow of air and fuel entering the cylinder means and heating means in close proximity to cylinder means having surfaces preselectively fixed in alignment with the dividing means and oriented to obliquely intercept the flow of air and fuel at each of two sides of the dividing means for heating the air and fuel to enhance fuel vaporization with minimal interference with the flow of the air and fuel to the cylinder means.

2. An internal combustion engine according to claim 1 wherein the heating device is mounted in a wall of the channel means to be fixed in alignment with the dividing means and to intercept the flow of air and fuel with minimal interference with the flow of the air and fuel to the cylinder means.

* * * * *